United States Patent
Karvinen et al.

(10) Patent No.: US 11,052,480 B2
(45) Date of Patent: Jul. 6, 2021

(54) NON-CONSUMABLE TOOL AND A PROCESS FOR SOLID-STATE PRODUCTION OF A CHANNEL AND A WELD JOINT, AND A STRUCTURE OF AT LEAST TWO COMPONENTS BASED ON ORIGINALLY BULK COMPONENTS OF SIMILAR, OR DISSIMILAR, MATERIALS

(71) Applicant: AALTO UNIVERSITY FOUNDATION SR, Aalto (FI)

(72) Inventors: Heikki Karvinen, Espoo (FI); Pedro Vilaca, Espoo (FI)

(73) Assignee: AALTO UNIVERSITY FOUNDATION SR, Aalto (FI)

( * ) Notice: Subject to any disclaimer, the term of this patent is extended or adjusted under 35 U.S.C. 154(b) by 20 days.

(21) Appl. No.: 16/312,511

(22) PCT Filed: Jun. 21, 2017

(86) PCT No.: PCT/FI2017/050467
§ 371 (c)(1),
(2) Date: Dec. 21, 2018

(87) PCT Pub. No.: WO2017/220863
PCT Pub. Date: Dec. 28, 2017

(65) Prior Publication Data
US 2019/0210147 A1 Jul. 11, 2019

(30) Foreign Application Priority Data

Jun. 23, 2016 (FI) ..................................... 20160165
Oct. 11, 2016 (FI) ..................................... 20160247

(51) Int. Cl.
*B23K 20/12* (2006.01)

(52) U.S. Cl.
CPC ........ *B23K 20/122* (2013.01); *B23K 20/1205* (2013.01); *B23K 20/1215* (2013.01)

(58) Field of Classification Search
CPC .......................................... B23K 20/122–128
(Continued)

(56) References Cited

U.S. PATENT DOCUMENTS

| 6,045,028 A * | 4/2000 | Martin | B23K 20/122 228/112.1 |
| 6,053,391 A * | 4/2000 | Heideman | B23K 20/122 228/2.1 |

(Continued)

FOREIGN PATENT DOCUMENTS

| CN | 102049610 A | 5/2011 |
| CN | 105290608 A | 2/2016 |

(Continued)

OTHER PUBLICATIONS

Balasubramanian et al. "Friction stir channeling: Characterization of the channels", pp. 3696-3704, 2009.*

(Continued)

*Primary Examiner* — Kiley S Stoner
(74) *Attorney, Agent, or Firm* — Charles C. Achkar; Ostrolenk Faber LLP.

(57) ABSTRACT

The invention relates to a rotatable, plungeable and free path travelable non-consumable tool (5) for production of a channel (2) and a weld joint (1). The tool (5) comprises a shoulder and a probe, the shoulder having a surface facing the material(s) of components (3) to be processed. The shoulder and the probe are arranged to have a simultaneous and synchronized action in the materials of at least two components (3) to be processed. The shoulder facing the at least two components (3) to be processed has a system of scrolls shaped to have an inward action and an outward (Continued)

action on the at least two components (3) to be processed. The probe has a cylindrical or conical surface having a top zone, provided with a profile having a push-up action on the components (3) to be processed in a direction towards the shoulder. The top zone ends at or in the vicinity of a bottom zone provided with a profile having a push-down action on the components (3) to be processed in a direction towards the tip. The tool (5) enables the production of a channel (2) and a weld (1), between said at least two components (3), in one single action.

10 Claims, 7 Drawing Sheets (58) Field of Classification Search
USPC .............................. 228/2.1–2.3, 112.1–114.5
See application file for complete search history.

(56) References Cited

U.S. PATENT DOCUMENTS

| | | | |
|---|---|---|---|
| 6,227,430 B1 | 5/2001 | Rosen | |
| 6,325,273 B1* | 12/2001 | Boon | B23K 20/1245 228/112.1 |
| 6,923,362 B2* | 8/2005 | Mishra | B23K 20/123 228/112.1 |
| 7,416,102 B1* | 8/2008 | Trapp | B23K 20/1225 228/112.1 |
| 9,573,222 B2* | 2/2017 | Tavares | B23K 20/126 |
| 2002/0153130 A1 | 10/2002 | Okamoto | |
| 2004/0050907 A1* | 3/2004 | Dracup | B23K 20/1265 228/112.1 |
| 2004/0060965 A1* | 4/2004 | Mishra | B23K 20/123 228/112.1 |
| 2005/0045694 A1 | 3/2005 | Subramanian et al. | |
| 2006/0108395 A1* | 5/2006 | Mishra | B23K 20/123 228/101 |
| 2008/0245516 A1* | 10/2008 | Ishikawa | F28F 3/12 165/164 |
| 2008/0251571 A1* | 10/2008 | Burford | B23K 20/1255 228/114.5 |
| 2009/0072007 A1 | 3/2009 | Nagano | |
| 2010/0089976 A1* | 4/2010 | Szymanski | B23K 20/122 228/113 |
| 2010/0101768 A1* | 4/2010 | Seo | B23K 20/1225 165/168 |
| 2010/0314075 A1* | 12/2010 | Takahashi | C23C 14/3407 165/104.19 |
| 2011/0073634 A1 | 3/2011 | Packer | |
| 2011/0180587 A1* | 7/2011 | Trapp | B23K 20/1265 228/2.1 |
| 2011/0277959 A1* | 11/2011 | Morin | B23P 15/26 165/104.11 |
| 2016/0175981 A1* | 6/2016 | Kandasamy | B23K 20/1245 228/114.5 |
| 2017/0304933 A1* | 10/2017 | Miles | B23K 9/042 |
| 2018/0200829 A1* | 7/2018 | Campbell | B23K 20/122 |
| 2018/0361501 A1* | 12/2018 | Hardwick | B23K 20/227 |
| 2019/0255647 A1* | 8/2019 | Gandra | B23K 20/1255 |

FOREIGN PATENT DOCUMENTS

| | | | | |
|---|---|---|---|---|
| JP | 2010260109 A | | 11/2010 | |
| JP | 4775431 B2 | * | 9/2011 | |
| WO | WO-03001136 A1 | * | 1/2003 | ............. C25D 11/04 |

OTHER PUBLICATIONS

International Search Report issued in International Application No. PCT/FI2017/050467, dated Sep. 18, 2017.
Written Opinion of the International Searching Authority issued in International Application No. PCT/FI2017/050467, dated Sep. 18, 2017.
Finnish Search Report issued in counterpart FN Application No. 20160165, dated Nov. 15, 2016.
Chinese Office Action issued in counterpart CN Application No. 201780039099.8, dated Jul. 6, 2020.
Finnish Search Report issued in counterpart Fn Application No. 20160247, dated Mar. 9, 2017.

* cited by examiner

NON-CONSUMABLE TOOL AND A PROCESS FOR SOLID-STATE PRODUCTION OF A CHANNEL AND A WELD JOINT, AND A STRUCTURE OF AT LEAST TWO COMPONENTS BASED ON ORIGINALLY BULK COMPONENTS OF SIMILAR, OR DISSIMILAR, MATERIALS

CROSS REFERENCE TO RELATED APPLICATIONS

The present application is a § 371 National Phase application based on PCT/FI2017/050467 filed Jun. 21, 2017, which claims the benefit of Finland application Nos. 20160165 filed Jun. 23, 2016 and 20160247 filed Oct. 11, 2016 the subject matter of each of which is incorporated by reference in their entirety.

FIELD OF INVENTION

The field of invention relates to the production in one simultaneous action of a channel and a weld joint between multiple (at least two) bulk components of similar or dissimilar materials, based on a new solution merging multiple concepts of solid-state friction stir processing methods.

OBJECT OF THE INVENTION

One object of the present invention is a rotatable, plungeable and free path travelable non-consumable tool for production of a channel and a weld joint, the tool comprising a shoulder and a probe, the shoulder having a surface facing the material(s) of components to be processed.

Another object of the present invention is a process for solid-state production of a channel and a weld.

Yet another object of the present invention is a multi-component structure with a closed channel and a weld between at least two components, obtainable by the process of the invention.

BACKGROUND

Internal closed channels are structural features with several high potential applications and usually found in hollow extruded components and heat transfer applications. There are several methods to create this type of channels, namely drilling, milling, extrusion, 3D-printing, electric discharge machining, casting, tubing and piping. The manufacturing method limits the channel design and some methods demand multiple processing stages to produce an internally closed channel. These limitations increase material usage of applications and impair opportunities to optimize structures efficiently. An example of a widely used channeling method is drilling. Drilling is fast and economic method to produce straight channels with circular cross-section. To produce complex channel paths, several straight drillings are needed with additional plugs to guide the flow into different directions. Another common example is milling. Fairly complex channels with alternative cross-sections are possible to manufacture by milling in a decent time. However, the milled channels are open and thus require a lid to become closed. This lid needs to be attached with additional subsequent processes. Some other examples are extruded based components where the channels are linear, and the use of tubes. Tubes can be bent in curved shapes and as they are sealed, no additional sealing is needed. Tubes, however require preformed groove or similar support from additional structural part e.g.

a plate or sheet. Use of tubes with support structures requires also additional joining method, and the inherent interfaces between multiple components reduce the heat transference efficiency. In general, all these methods have low flexibility in changing the channel design adjusting it to better design solutions or new requirements. 3D-printing of metals is a method that can create complex channels made of various materials.

However, for metallic components the manufacturing speed of 3D-printing is currently low and the process requires expensive base material, e.g. metal powders, whose manufacturing is energy intensive. The conventional Friction Stir Channeling (FSC), is a flexible technique to manufacture internal closed channels with free path, but intended to be applied in bulk components. The new process of the invention is intended to be applied in one action only, enabling to optimize multi-component structures made of similar, or dissimilar, materials, standing as a new paradigm in the production of internal closed channels with free path.

PRIOR ART DESCRIPTION

The friction stir based processes have experienced significant developments, mainly since the invention of the Friction Stir Welding (FSW) by Wayne Thomas et al. (TWI, UK) in 1991 [1]. One relevant variant of the friction stir based processes is the FSC process that was patented in 2005, by Mishra as a method of manufacturing heat exchangers [2]. Mishra proposed that by reversing the material flow pattern and by selecting the appropriate processing parameters of friction stir processing, it is possible to produce continuous and stable channels inside monolithic metal components. The concept of generating the channels was introduced as result of converting the cavity defect, an internal defect that can be found in FSW joints, into a stable manufacturing technique where all the material extracted from the metal workpiece is laid on the processed zone bellow the tool shoulder, within a clearance between the tool shoulder and the metal workpiece. The need for this clearance, or gap, is the main difference between the first concept of FSC and the conventional friction stir processing procedures where the base of the tool shoulder is kept in contact with the top surface of the metal workpiece to generate the forging action required to produce defect-free components. Later, in 2009, Balasubramanian et al. [3] presented the characterization of these channels.

A new concept of the original FSC process was patented in 2013 by Vidal and Vilaça [4]. The new concept is based on a distinct material flow, where a controlled amount of viscoplasticized material from the metal workpiece flows out from the processed zone producing the internal channel without any gap between the tool shoulder and the solid metal workpiece. Thus, the material flowing from the interior of the solid metal workpiece is not deposited on the processed surface but directed outside of the processed zone in the form of self-detachable flash. The scrolls on the tool shoulder enable this material flow from under the shoulder centre to the periphery of the processed zone. The position and size of the channels can therefore be controlled and the processed surface can be left at the same initial level. These channels are detailed characterized by Vidal [5] in her PhD thesis and by Vilaça et al. [6].

More recently, Rashidi et al. [7, 8] reported on an alternative approach to perform FSC named modified FSC. In this approach, a non-threaded tool probe with tilt angle and a clearance between the shoulder and the top surface of the metal workpiece are used for extracting material and creating the channel. No new concept is introduced with this last approach.

Some other inventions exist including channels and friction stir based processes, but they have no resemblance with the concept of the process of the present invention. As an example, Davis published in 2014 [9] a method for routing an electrical conductor through a sub-surface channel in substantially any suitable metallic article of manufacture includes friction stir welding a cap in a groove formed in a surface of the article so as to form the sub-surface channel. In this case, the FSW is used to close a structural component in which the original configuration already defined the channel.

SUMMARY OF THE INVENTION

The rotatable, plungeable and free path travelable non-consumable tool of the invention is characterised in that the shoulder and the probe are arranged to have a simultaneous and synchronized action in the materials of at least two components to be processed, the shoulder facing the at least two components to be processed having a system of scrolls shaped to have an inward action and an outward action on the at least two components to be processed; and in that the probe has a cylindrical or conical surface having a top zone, provided with a profile having a push-up action on the components to be processed in a direction towards the shoulder, said top zone ending at or in the vicinity of a bottom zone provided with a profile having a push-down action, on the components to be processed, in a direction towards the tip, enabling the production of a channel and a weld, between said at least two components, in one single action, in order to integrally join said at least two components together.

Preferred embodiments of the non-consumable tool according to the invention are defined in the dependent claims 2 to 6.

The process of the invention is characterised in that the channel and weld are produced simultaneously by a rotating non-consumable tool with a shoulder and a probe, where both are able to apply simultaneously solid-state joining and material extracting mechanisms into the materials within the stirred processed zone, wherein the channel and the weld between at least two material components are produced in one single and simultaneous action.

Preferred embodiments of the process of the invention are defined in the dependent claims 7 to 17.

The features of the multi-component structure according to the invention are defined in claim 18.

Figure 1:
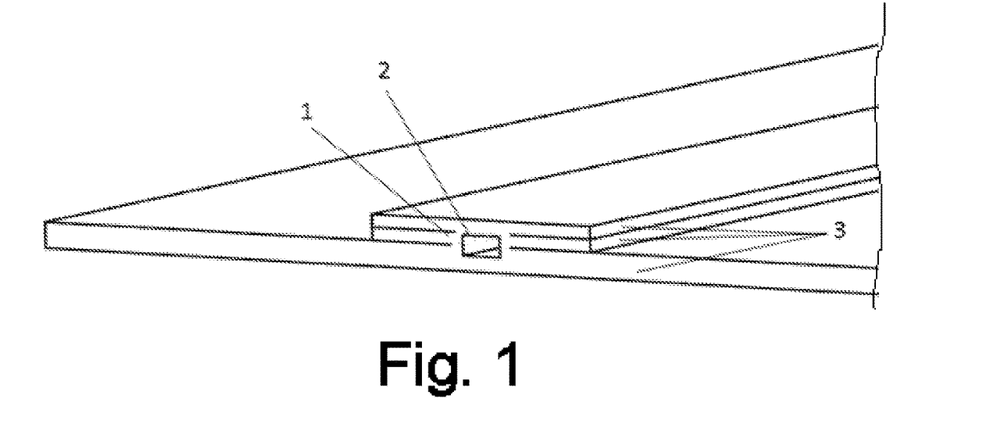
FIG. 1 shows the weld 1 and the internally closed channel 2 within the processed zone, produced in one simultaneous action as result of the process of the invention applied to multiple components 3.
Figure 2:
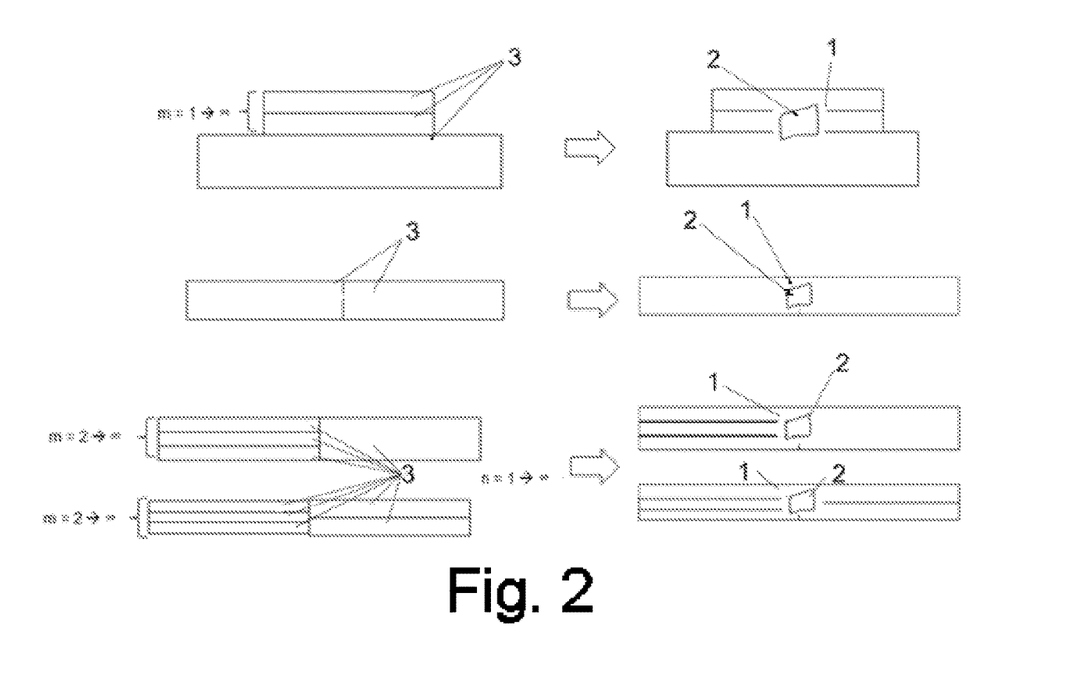
FIG. 2 depicts optional joint design solutions for application of the process of the invention. Multiple components 3 are welded 1 with internal channel 2 to form overlap, butt or combination of overlap and butt joints.

The process of the invention is a process to manufacture, in one simultaneous action, tailor-made internal closed channels and a weld joint between multiple components (FIG. 1). The geometrical arrangement of the multiple components in the joint can be designed in an overlap joint, butt joint or a combination of overlapped with butt joint (as represented in FIG. 2). The multiple components can be of similar or dissimilar materials. The process of the invention uses a non-consumable tool that deforms plastically the processed zone of the multiple components. During the process of the invention the material of the multiple components is stirred, activating solid-state joining mechanisms in the processed zone, resulting in the weld. In simultaneous, the geometrical features of the tool extract part of the stirred material from the processed zone into external flash, resulting in the channel. The process of the invention is controllable, repeatable and able to produce channels with a wide range of dimensions and free-path. The channels can have constant or continuously variable cross-section dimensions. The finishing of the channel surfaces is rough, which creates easily turbulent flow at low flow rates allowing a production of efficient heat transfer systems that are operated with low energy.

All the previous concepts existent for the FSC process are meant to be applied in a monolithic component. The new process of the invention enables structural design solutions where extra thickness can be locally added, or 3rd body materials with dedicated physical/chemical properties can be included in the production of the channels. Thus, the process of the invention is a disruptive concept, enabling new and more efficient structural designs to be implemented.

LIST OF FIGURES

FIGS. 4a and 4b show the general conditions for application of the clamping 6 and anvil 7 to process of the invention process between overlapped dissimilar multiple components 3. FIG. 4a presents the position at the start of the process; FIG. 4b represents the condition during the process, with emphasis for the weld 1 and channel 2 along with the formation of detachable external flash 4, laying at the sides of the tool 5.

FIGS. 5a, 5b and 5c show the sequence of application of the process of the invention to weld 1 open a channel 2 in one simultaneous action between multiple components 3: FIG. 5a depicts the generic disposition of overlapped multiple components 3 in a continuous sequence of stacks along a non-linear path; FIG. 5b depicts the application of the process of the invention process; FIG. 5c shows the final condition of the process of the invention process with emphasis for the weld 1 and channel 2 produced simultaneously along the complex path from the assembled multiple components 3.

FIGS. 6a and 6b depict that the weld 1 and the channel 2 between the multiple components 3 can be produced by the process of the invention tool 5 with or without air-gap 8: FIG. 6a depicts the air-gap 8 after the process of the invention process cycle; FIG. 6b shows the air-gap 8 established in the joint design before the process of the invention procedure.

a) The capacity to produce channels 2 and welds 1 simultaneously, in one action, in originally bulk components, along complex and free paths: spirals in opposite directions, namely, from inside to the outside (right) and from the outside to the inside (left).

b) The flash 4 can be self-detachable, or non-self-detachable.

DETAILED DESCRIPTION OF THE INVENTION

In the following the invention is described in more detail in the form of preferred embodiments referring to the FIGS. 1 to 6.

In FIG. 1 is shown a structure of at least two components as obtained in the present invention. The structure of at least two components consists of three metal plates 3 joined together by a weld 1 and an internally closed channel 2, the weld and channel being produced within the processed zone, in one simultaneous action as result of the process of the invention applied to the multiple components 3.

FIG. 2 depicts a number of different ways or designs to apply the process of the invention:
a) Overlap joint design, wherein three components 3 overlapping each other are joined together by producing a channel 2 and a welding 1 between all three components 3. Symbols "m" and "n" in the figure refer to the number of components 3.
b) Butt joint design, wherein two components 3 are welded 1 with an internal channel 2 to form a butt joint between them. Symbols "m" and "n" in the figure refer to the number of components 3.
c) Two examples of combination of overlap and butt joints, wherein components 3 are welded 1 with an internal channel 2 to form a butt joint between them. Symbols "m" and "n" in the figure refer to the number of components 3.

Figure 4A:
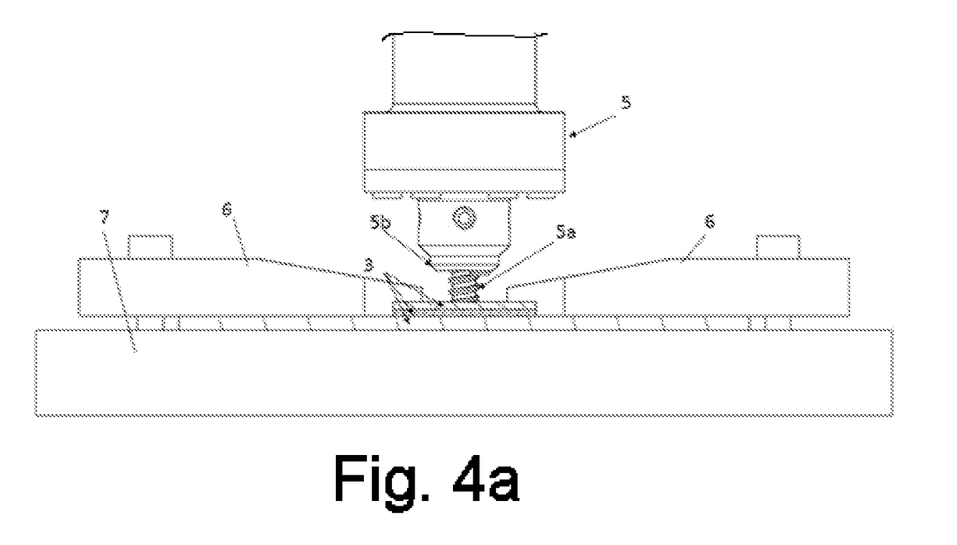
Figure 4B:
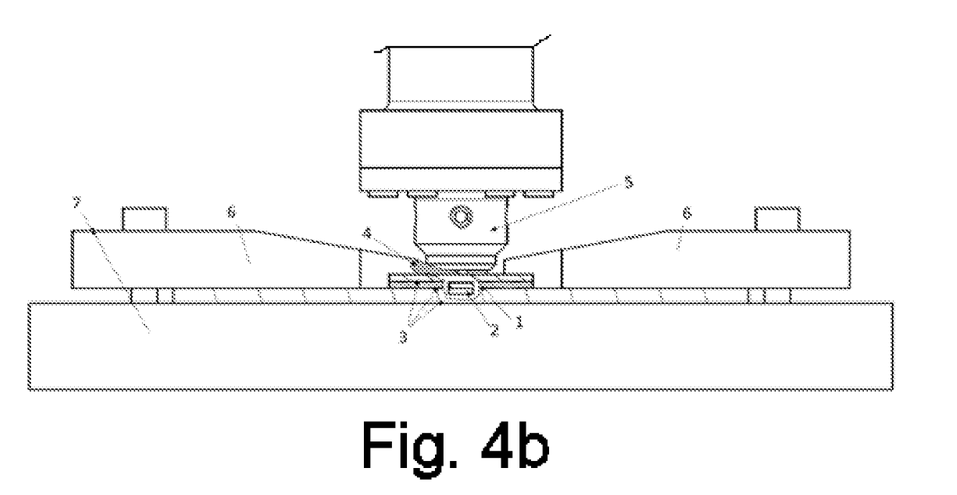

In FIGS. 4a and 4b is depicted a non-consumable tool 5 for solid-state production of a channel 2 and a weld 1 joint by friction stirring. The tool 5 comprises a shoulder 5b and a probe 5a. In this particular embodiment of the tool 5 the shoulder 5b and the probe 5a are provided as separate sub-components that are assembled together for the friction stir welding process by inserting the none-forging end of the probe 5a through a centralised space 15 in the shoulder 5b and fixing it to the tool 5. The tool is provided with means for rotating (not shown) the shoulder 5b and the probe 5a assembly together around the rotational axis they have in common. The tool is further provided with means for plunging i.e. forcing the probe 5a and shoulder 5b assembly perpendicularly against the material components to be processed, while the tool is rotating around its rotational axis (not shown). In an alternative embodiment of the tool 5 the probe 5a and the shoulder 5b may be made of one single integral part.

Figure 3A:
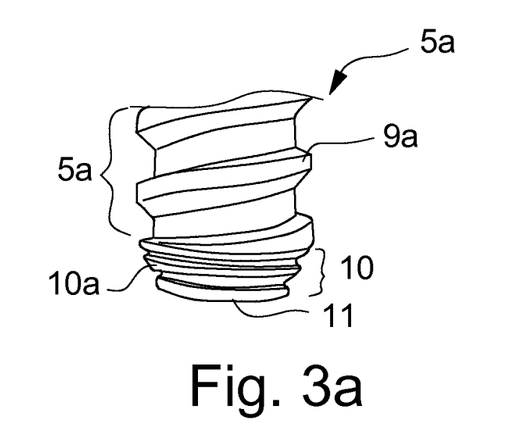
FIG. 3a shows one embodiment of the threading at different zones of the circumferential surface of the probe.
Figure 3B:
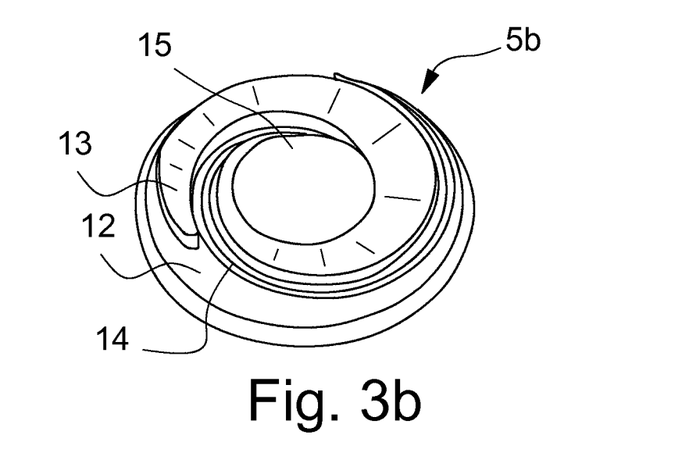
FIG. 3b shows one embodiment of the scrolls on the surface of the shoulder.

As depicted in FIG. 3b, the shoulder 5b has a surface 12 facing the material 3 to be processed, which is provided with a first scroll 14 shaped to have an inward action on the material 3 to be processed, and a second scroll 13 shaped to have an outward action on the material 3 to be processed. The probe 5a has a tip 11 that may be flat, convex or concave or combination of aforementioned shapes. As shown in FIG. 3a, the probe 5a also has a circumferential surface having a first zone 10 ending at or in the vicinity of the tip 11 of the probe 5a that is provided with a first threading 10a having a push-down action on the material 3 to be processed, as well as a second zone 9 provided with a second threading 9a having a push-up action on the material 3 to be processed, thus enabling the channel 2 and the weld 1 between at least two components of material 3 to be produced in one single and simultaneous action.

The process of the invention is a solid-state process that is applied to join or weld 1 multiple components 3 with a channel 2 within the processed zone. The application of the process of the invention is done by plunging a rotating rigid non-consumable tool 5 with a shoulder 5b and a probe 5a rotating together, where both are able to apply simultaneously push up and down effects into the zone of at least two components 3 to be processed. The tool 5 has a probe 5a and a shoulder 5b that can be made of separated sub-components assembled together, or made of one only part.

The rotating and plunging tool 5 travels along the path, which may be manually or automatically, resulting simultaneously in the channel 2 and weld 1 to be produced. The at least two components 3 are strongly clamped 6, against an anvil 7. The plunging and rotating probe 5a will apply into the at least two components 3 a combined push-up and push-down actions producing the channel and the weld, respectively. The likewise plunging and rotating shoulder 5b will apply a combined inward and outward actions closing the top of the channel and producing the external detachable flash 4, respectively. The channel 2 is surrounded by a stirred zone with contribution from the at least two components 3, where the solid-state joining mechanisms have been activated, resulting in the welding 1 of the at least two components 3. The resulting flash 4 that flows out of the tool domain is removable.

In FIGS. 4a and 4b are depicted the general conditions for application of the clamping 6 and anvil 7 to the process of the invention process between overlapped dissimilar multiple components 3: FIG. 4a shows the position at the start of the process; FIG. 4b shows the condition during the process, with emphasis for the weld 1 and channel 2 along with the formation of detachable external flash 4, laying at the sides of the tool 5.

Figure 5A:
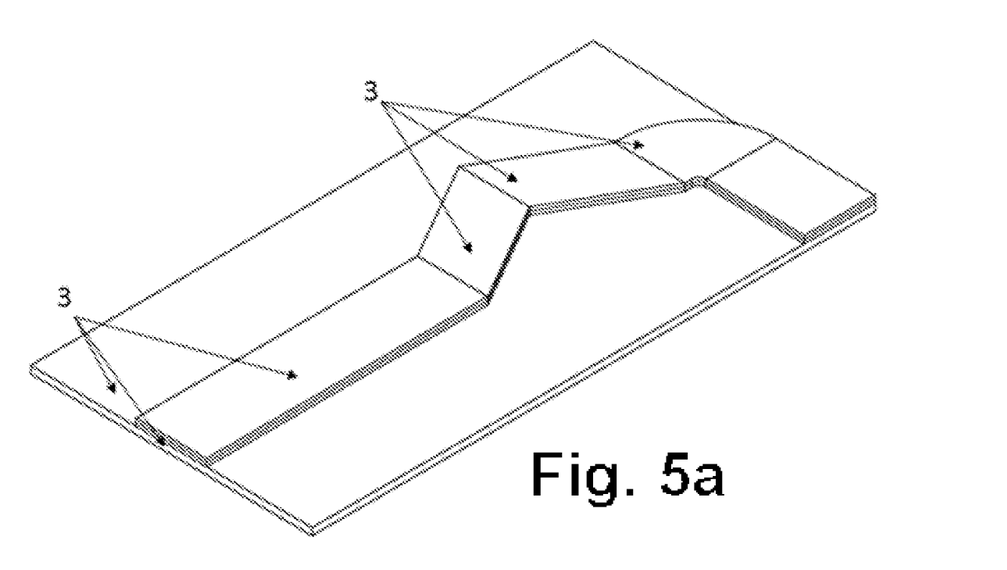
Figure 5B:
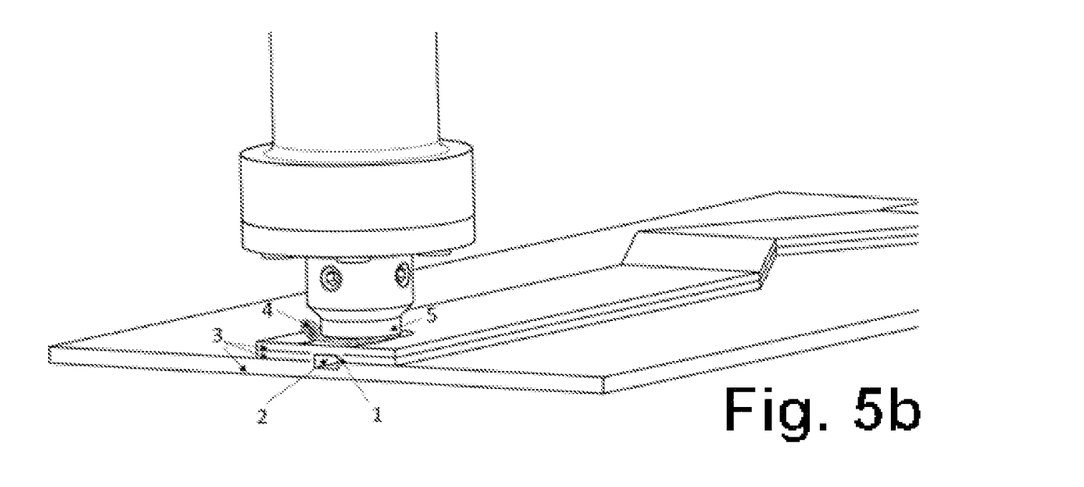
Figure 5C:
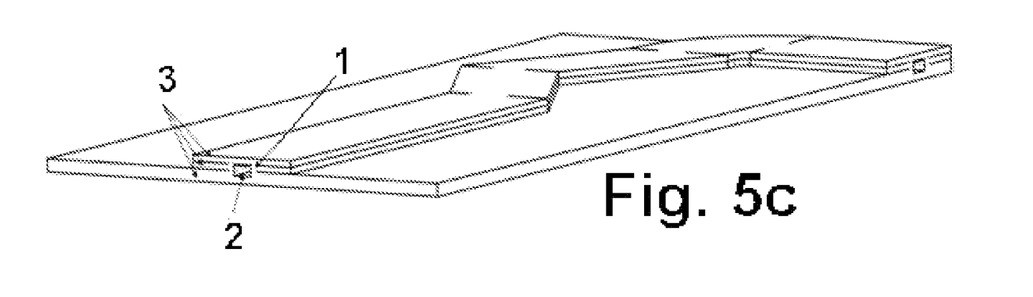

The process of the invention does not require any tilt angle of the tool 5, enabling the application of the process of the invention in the production of channels 2 with complex paths. The multiple components 3 can have different sizes and materials. In addition, any of the multiple components along the processed path are made of one component or made of piecewise sub-components. The quantity of the multiple components is not restricted therefore the weld 1 and the channel 2 can be made between two or more components 3. The joint between the multiple components 3 can be designed in multiple configurations with or without air-gap 8. The multiple configurations for the process of the invention are overlap joint, butt joint or a combination of overlap with butt joint. The top surface of the processed zone can be left, with reinforcement, or in its original position, by varying the amount of flash 4 that flows out of the domain of the processed zone. The principle is that the volume of flash material that flows out of the processed domain is equal, or less, to the volume of the channel. At least two components and sub components 3 are made of massive or bulk materials with no welds or pre-shapes, including but not limited to grooves, open or closed channels or recess existing, before the process is applied In FIGS. 5a, 5b and 5b is shown a sequence of application of the process of the invention to weld 1 open a channel 2 in one simultaneous action between at least two components 3, that can be continuous or in a piecewise sequence: FIG. 5a shows the generic disposition of overlapped at least two components 3 in a continuous sequence of stacks along a non-linear path; FIG. 5b shows the application of the process of the invention process; FIG. 5c depicts the final condition of the process of the invention process with emphasis for the weld 1 and channel 2 produced simultaneously along the complex path from the assembled at least two components 3.

Figure 6A:
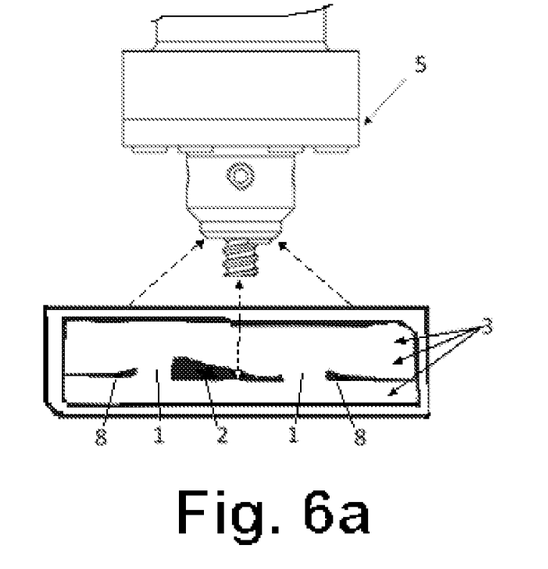
Figure 6B:
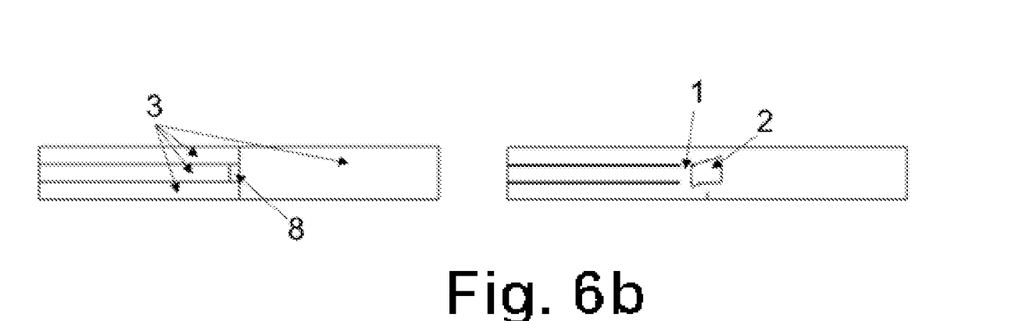

In FIGS. 6a and 6b is shown the weld 1 and the channel 2 between the multiple components 3 can be produced by the process of the invention tool 5 with or without air-gap 8: FIG. 6a shows an air-gap 8 after the process of the invention process cycle; FIG. 6b shows an air-gap 8 established in the joint design before the process of the invention procedure.

Further Findings and Details on Tool Design

It has been found that tool design, in combination with proper processing parameters, is a crucial aspect of FSP technologies. Tool design is responsible for creating the frictional heating and promoting the distinct viscoplasticized material flows observed during operation. Inadequate tool design will fail to produce closed and continuous channels regardless of the processing parameters. However, a tool with the perfect geometry will also fail to produce closed and continuous channels with improper processing parameters. Parameters for the process of invention include but are not limited to tool rotation speed and tool travel speed. The tool rotation speed ranges from 200 to 1000 rpm and the tool travel speed ranges from 30 to 500 mm/min.

Probe Design

Probe design is crucial to the channel formation and joining of multiple components during the process of the invention. The probe is responsible for the frictional heating, shear deformation and mixing of the viscoplasticized material in the third body region.

Figure 9:
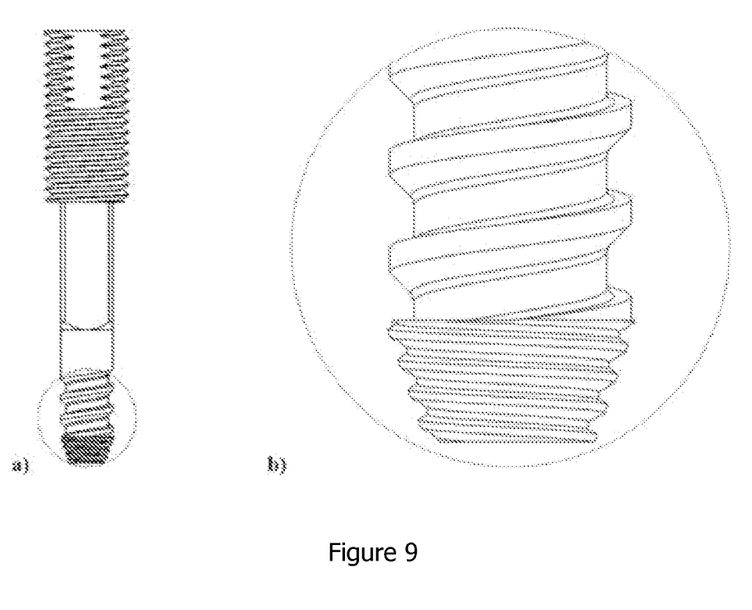
FIG. 9 presents a welding probe profile of the tip of a standard FSC probe.

The probe geometry is responsible for creating a flow of material from the processed zone to the shoulder and for creating a mixing and forging effect in the weld zone. The probes of the invention are specifically designed to function as a channeling probe while also performing necessary welding functions. This is accomplished by applying a welding probe profile to the tip of a standard FSC probe as represented in FIG. 9. The diameter of the probes is 10 mm. The welding tip is created using a 30° tapered LHT with a pitch of ⅛ of the probe diameter and a thread depth of ¼ of the thread pitch. Length of welding tip varies from ⅓ of the probe diameter to ½ of the probe diameter. The channeling body is created using a Right Hand Thread (RHT) with a pitch of 0.4 times the probe diameter and a thread depth of ¼ of the thread pitch. When rotated Clockwise (CW), the HFSC probe induces two distinct material flow characteristics during channeling. First, the welding tip produces a downward flow of viscoplasticized material while also creating a rotational mixing flow effectively bonding two components together. Second, the channeling body induces an upward flow of viscoplasticized material out of the processing zone to the shoulder.

Three distinct probe models were created and manufactured by adjusting the length of the welding tip to 3 mm, 4 mm or 5 mm lengths. Changing the length of the welding tip provides different levels of flexibility in the tool set up concerning probe protrusion length and in the performance of the tool during channeling. Too small of a welding tip will result in an inadequate weld nugget and low flexibility in tool setup. Too large of a welding tip will result in excess bending forces on the tool during operation and an oversized welding nugget. However, a larger welding tip provides more flexibility in tool setup.

Probes were made out of AISI H13 tool steel. It was chosen for tooling production due to the mechanical properties and attributes of the steel grade. H13 has a high resistance to thermal shock and thermal fatigue, good high temperature strength, excellent toughness and ductility, good machinability, excellent through-hardening properties and good dimensional stability during hardening [10]. All probes were heat treated to 50 HRC for optimal wear resistant properties.

Figure 7:
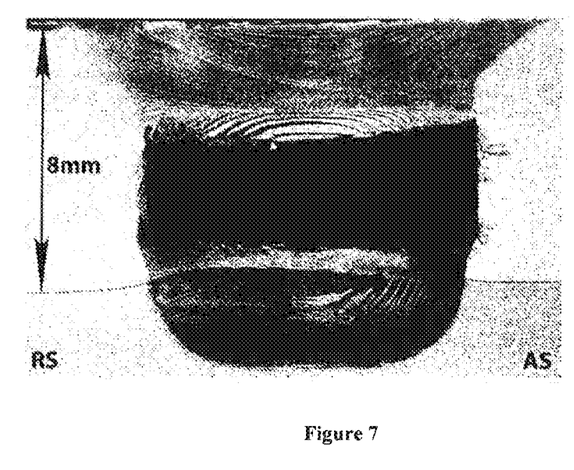
FIG. 7 depicts the application of the process of the invention to produce a channel and weld simultaneously, in one action, within two overlapped components of AA5083-H111, with thickness of 8 mm (at the top) and 5 mm (at the bottom). The parameters applied were travel speed (90 mm/min) and rotation speed (300 rpm).

All HFSC probes were successful in producing an internal closed channel and a weld in aluminium plates. To understand the differences in performance of each of the probes, the weld nugget was examined (FIG. 7). All three probes produced defect free welds. Observing FIG. 7a reveals that the effective thickness (x—FIG. 3.9) of the weld nugget above the interface zone is quite small and was measured to be 0.73 mm thick. The effective thickness x of the weld nugget above the interface zone for the 4 mm (FIG. 7b) and 5 mm (FIG. 7c) probes was 2.05 mm and 1.17 mm respectively. This shows that the 4 mm probe produced a stronger weld than the other probes. However, the thickness of the weld nugget above the interface zone for the 3 mm and 5 mm probes could be increased by decreasing the probe plunge depth. The 4 mm probe was determined to be the superior probe due to a large weld nugget allowing for more adjustability and flexibility than the 3 mm probe while also reducing the magnitude of the forces exerted on the probe during channeling operations compared to the 5 mm probe.

Along with the production of stable welds, all three probes produced unstable welds as well. The main defect phenomenon observed was the "hook effect" on the advancing side (AS) of the weld at the interface zone (FIG. 4.4). This "hook effect" is produced due to insufficient mixing of material where the interface zone is not properly stirred and destroyed. As a result, the interface zone is pushed upwards in a reverse flow to the channel bottom. Due to the lack of mixing, the interface zone in the "hook effect" is not properly bonded resulting in a weak joint, which is prone to leakage and failure.

To eliminate this "hook effect" phenomenon, a new probe design was considered. For this design a 4 mm welding tip was utilized based on the findings presented previously regarding the weld quality produced by the three HFSC probes. The new design reduced the overall diameter of the welding tip by 2 mm to incorporate a 1 mm shoulder at the interface between the channeling section and the welding tip of the probe. The shoulder was designed to increase the forging effect of the probe on the weld, in order to reduce the reverse flow of material, effectively eliminating the lifting effect. The shoulder was also designed to reduce the tilt in the channel bottom produced by the HFSC probes.

Based on channel geometric features, channel stability, the size of the effective weld thickness and the forces acting on the probe, the optimal probe design was found to be the 4 mm HFSC probe.

Shoulder Design

Shoulder geometry is crucial to the channel formation and flash removal during the HFSC process. The shoulder is responsible for forging the viscoplasticized material extracted by the probe down into the top of the channel forming the channel ceiling as well as to remove a specific amount of material in the form of detached flash. By creating detached flash, the processed surface is left at the initial level of the metallic component.

An already existing shoulder with an outer diameter of 24 mm was chosen and utilized as the control for the development of all new shoulders, in order to have a reference point for quality, performance and design criteria. All developed shoulders possess an outer diameter of 2.2 times the probe diameter. The shoulder names can be understood in Table 1. All shoulders were made out of the same AISI H13 steel and underwent the same heat treatment as the probes. In order to evaluate the performance of the shoulders on channel production, several assessment criteria were established.

Assessment Criteria for Shoulder Performance
1. Channel is closed and continuous.
2. Flash is removed and processed surface is left at initial level.
3. Channel cross-section is stable in regards to shape and size.
4. Channel quality is constant and stable concerning surface roughness.

TABLE 1

| | |
|---|---|
| + | Positive Scroll |
| − | Negative Groove |
| # | Number of Scrolls or Grooves |
| IN | Moves Material Towards Probe |
| OUT | Moves Material Away From Probe |
| # | Angle of Scroll or Groove from Probe to outside of Shoulder |
| B | Bevelled Edge |
| # | Angle of Bevel |

Several different shoulders were manufactured and tested. Shoulder (+1OUT300/+1IN90) was chosen as the optimal shoulder for further testing and development. In an attempt to manipulate channel size, two alternative shoulders were created by altering the scroll height from 1 mm to 1.5 mm and 2 mm. In theory, a scroll with a larger height would allow more material to flow out of the processed zone into the shoulder cavity. This increased flow of material would be removed from the processed zone in the form of detached flash. Subsequently, the channel would be larger than that produced by a shorter scroll.

TABLE 2

Rating of Shoulders Performance According to Assessment Criteria

| Shoulder | Closed channel | Removed flash | Consistency (shape and size) | Channel quality (Roughness) | Total |
|---|---|---|---|---|---|
| Control | 0 | 0 | 0 | 0 | 0 |
| Flat | 1 | 0 | 1 | 1 | 3 |
| (+1OUT300/+1IN90) | 1 | 0.8 | 1 | 1 | 3.8 |

+1OUT300/+1IN90

The majority of the scroll is flat with a rib radiating outwards from the start position. Width and height of the rib are 0.068 and 0.045 times the shoulder diameter, respectively. Curvature of the end and star of the scroll equals to the width of the scroll. The flat area of the scroll produces a consistent, constant and even forging force as well as it maintains a large contact time throughout a single rotation. The scroll width increases from the start position in an arced path until making contact with the probe hole after 90° C. rotation. The flared section then tapers off to the shoulder surface while the rib continues to radiate outward 300° in total. The rib contacts the outer edge of the shoulder after 280°. The rib has 0.5 mm fillet between itself and the flat area. The reentrant, located at the start of the scroll, is designed to induce an inward flow of material back to the probe reducing the speed and quantity of material being extracted to the periphery of the shoulder. Large scroll rotation angle increases the shear edge of the scroll while allowing for an outward flow of material. The increased shear edge of the scroll promotes the detachment of the flash from the processed surface. The scroll contact to the outer edge of the shoulder forces the processed material out of the processed zone reducing the chances of material deposits on the processed surface.

It was observed that the original shoulder with 1 mm scroll produced stable channels with no flash deposits, leaving the processed surface at the initial level. The shoulders with 1.5 mm and 2 mm high scrolls failed to produce closed and continuous channels. The flash formation created by these shoulders was large and continuous. Most of the flash was removed in large, spiraling strands with small amounts sticking to the processed surface. The 1.5 mm and 2 mm scrolls failed to create closed and continuous channels due to the excess material extracted as flash from the processed zone. The excess material extracted was caused by the increased volume of the pocket around the scroll, allowing more material to be processed and removed instead of being forged back into the channel ceiling.

Material build-up in shoulder (+1OUT300/+1IN90) is consistent throughout channeling operation. The re-entrant feature consistently fills with material during channeling, resulting in a lack of flow to the probe in this area. However, the accumulation of aluminium has an adverse benefit of slowing extracted material as it is pushed to the periphery of the shoulder. This phenomenon is caused due to material properties of aluminium. As aluminium is processed in a viscoplasticized state, the aluminium wants to stick to aluminium. With the re-entrant feature accumulating aluminium, all future material extracted sticks to this reservoir of aluminium effectively slowing the flow of extracted material. This slowing of material promotes and increases the forging effect of the scroll resulting in a closed and continuous channel formation.

Figure 8:
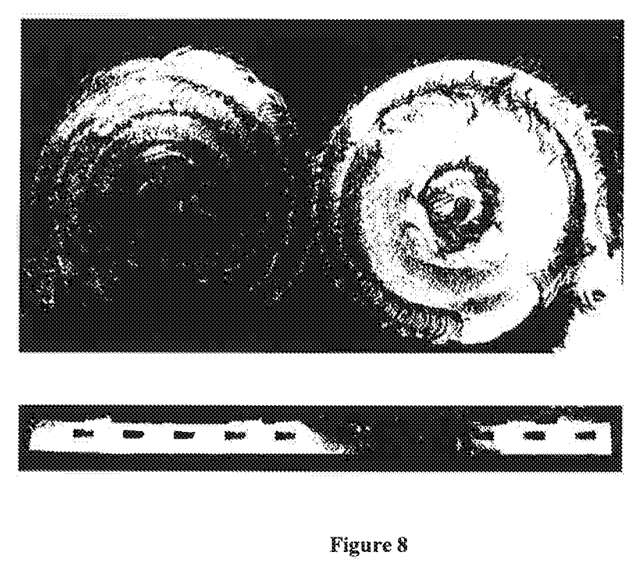
FIG. 8 presents a top view and view of the cross-section of two spirals made in opposite with the method, applied to two overlapped component (3) emphasizing.

Based on the findings of the inventors it was determined that the optimal shoulder geometry is shoulder (+1OUT300/+1IN90). With the validation of a functional and optimized shoulder design all further studies were performed with the use of shoulder (+1OUT300/+1IN90). It can be seen in the FIG. 8 that the shoulder (+1OUT300/+1IN90) produces successfully stable channels in a free path (spiral).

CITATIONS

[1] W. M. Thomas, E. D. Nicholas, J. C. Needham, M. G. Murch, P. Temple-Smith, C. J. Dawes, U.S. Pat. No. 5,460,317: Friction welding. 24 Oct. 1995.
[2] R. S. Mishra, U.S. Pat. No. 6,923,362: Integral channels in metal components and fabrication thereof. 2 Aug. 2005.
[3] N. Balasubramanian, R. S. Mishra, K. Krishnamurthy (2009) Friction Stir Channeling: Characterization of the Channels. Journal of Materials Processing Technology (vol. 209), pp. 3696-3704.
[4] P. Vilaça, C. Vidal. Patent PT 105628: Process of Opening Internal Continuous Channels in Massive Components Without Changing the Original Position of the Processed Surface and Respective Modular Adjustable Tool. 15 Apr. 2013.
[5] C. Vidal (2014) Development and Mechanical Characterization of a New Manufacturing Technology: Friction Stir Channeling. PhD thesis in Mechanical Engineering at Instituto Superior Técnico, University of Lisbon, Portugal.

[6] P. Vilaça, J. Gandra, C. Vidal (2012) Linear Friction Based Processing Technologies for Aluminum Alloys: Surfacing, Stir Welding and Stir Channeling. Aluminium AlloysNew Trends in Fabrication and Applications, Chapter 7, InTech. pp. 159-197.

[7] A. Rashidi, A. Mostafapour, S. Salahi, V. Rezazadeh (2013) Modified Friction Stir Channeling: A Novel Technique for Fabrication of Friction Stir Channel, Applied Mechanics and Materials (vol. 302), pp 365-370.

[8] A. Rashidi, A. Mostafapour (2015) Influence of tool pin geometry and moving paths of tool on channel formation mechanism in modified friction stir channeling technique. Journal of Advanced Manufacturing Technology (Vol. 80), pp. 1087-1096.

[9] R. Davis, U.S. Pat. No. 8,783,366: Article of manufacture having a sub-surface friction stir welded channel. 22 Jul. 2014.

[10} Uddeholm, "Uddeholm," 09, 2013. [Online]. Available: http://www.uddeholm.com/files/PB_orvar_supreme_english.pdf. [Accessed 16 Dec. 2016].

LIST OF NOMENCLATURE

1—Weld
2—Channel
3—Components
4—Flash, self-detachable, or non-self-detachable
5—Non-consumable tool
5a—Probe
5b—Shoulder
6—Clamping system
7—Anvil
8—Air-gap between the components (3) before being processed
9—Probe top zone
9a—Thread profile having a push-up action
10—Probe bottom zone
10a—Thread profile having a push-down action
11—Tip surface of the probe
12—Base surface of the shoulder
13—Part of the system of scrolls with a profile with outward action
14—Part of the system of scrolls with a profile with inward action
15—Centralized space for the probe (5a)

The invention claimed is:

1. A process for solid-state production of a channel and a weld joint by simultaneous friction stir channeling (FSC) and friction stir welding (FSW) of at least two components, the process comprising:
   (a) providing at least two components to be processed;
   (b) providing a rotating non-consumable tool, wherein the tool has a probe and a shoulder; wherein:
      i. the probe comprises a top portion and a bottom portion;
      ii. the top portion has a first thread shaped to have an upward action pushing the material of the components towards the shoulder;
      iii. the bottom portion has a second thread shaped to have a downward action on the material of the components and to activate solid-state joining mechanisms within the stirred processed zone of the at least two components, thereby producing a weld; and
      iv. the shoulder has a surface with a system of scrolls having a first scroll shaped to have an inward action on the material of the components, and a second scroll shaped to have an outward action on the material of the components; and
   (c) rotating the tool while the tool traverses along the components, plunging the tool into the components and penetrating the components to a depth such that there is no gap between the shoulder of the tool and the uppermost surface of the components;
   wherein:
      i. the actions of the probe and the shoulder are simultaneous and synchronized to activate solid-state joining between the components and extracting out into a flash a part of the material of the components in a stirred processed zone;
      ii. the amount of the material extracted has a corresponding volume left empty in the components in a form of an internal closed channel;
      iii. the channel and weld are produced simultaneously, in a single action, in the components in the stirred processed zone; and
      iv. the flash is self-detachable or non-self-detachable.

2. The process according to claim 1, wherein the said at least two components, at least along the stirred processed zone have no welds or pre-shapes existing, before the process is applied.

3. The process according to claim 1, wherein the rotating non-consumable tool is plunged and traversed within the at least two components to be processed, thereby producing simultaneous and synchronized actions, that include
   a) a bottom zone of the probe pushing-down to stir the material of the at least two components and activate solid-state joining mechanisms within the stirred processed zone of the at least two components, thereby producing a weld, and
   b) a top zone of the probe pushing-up a part of material from the stirred processed zone into the shoulder direction,
   c) a profile of a first part of the system of scrolls on the surface of the shoulder causing a portion of the material to flow out of the stirred processed zone, to form an external flash, and
   d) a profile of a second part of the system of scrolls causing a portion of the material to flow inward to generate a closed ceiling for the channel, closing it.

4. The process according to claim 1, wherein the said at least two components are overlapping, abutting or in an arrangement including simultaneously overlapping and abutting each other.

5. The process according to claim 1, wherein the at least two components are made of the same or different materials, wherein the materials are metals.

6. The process according to claim 1, wherein the at least two components have similar or dissimilar dimensions.

7. The process according to claim 1, wherein the channel and the weld are produced simultaneously along a processed free-path in any direction within the at least two components.

8. The process according to claim 1, wherein the dimension of the channel produced along the processed free-path within the said at least two components, is constant, continuously variable or a combination of constant and variable zones.

9. The process according to claim 1, wherein
   a distance between a tip of the probe and a surface of the shoulder facing the at least two components to be processed is dimensioned such that at least the tip of the probe may penetrate into all of said at least two components, and the surface of the shoulder, with its system of scrolls, is arranged to engage, with no gap, or having a shallow penetration in the surface of the uppermost component, when the tip of the probe has penetrated into all said at least two components and to process the surface of the uppermost component.

10. The process according to claim 1, wherein the flash is self-detachable.

\* \* \* \* \*